(12) United States Patent
Nassi et al.

(10) Patent No.: US 10,558,462 B2
(45) Date of Patent: Feb. 11, 2020

(54) APPARATUS AND METHOD FOR STORING SOURCE OPERANDS FOR OPERATIONS

(71) Applicant: Arm Limited, Cambridge (GB)

(72) Inventors: Luca Nassi, Antibes (FR); Cédric Denis Robert Airaud, Saint Laurent du Var (FR); Rémi Marius Teyssier, Le bar sur loup (FR); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 76 days.

(21) Appl. No.: 15/987,002

(22) Filed: May 23, 2018

(65) Prior Publication Data

US 2019/0361705 A1    Nov. 28, 2019

(51) Int. Cl.
*G06F 9/30* (2018.01)
*G06F 9/38* (2018.01)

(52) U.S. Cl.
CPC ........ *G06F 9/3836* (2013.01); *G06F 9/30123* (2013.01); *G06F 9/30145* (2013.01)

(58) Field of Classification Search
CPC ............................ G06F 9/30123; G06F 9/3836
See application file for complete search history.

(56) References Cited

U.S. PATENT DOCUMENTS

| | | | | |
|---|---|---|---|---|
| 5,377,345 A * | 12/1994 | Chang | ................ | G06F 12/0859 711/118 |
| 6,681,319 B1 * | 1/2004 | Djafarian | .................. | G06F 5/01 712/204 |

\* cited by examiner

*Primary Examiner* — William B Partridge
(74) *Attorney, Agent, or Firm* — Nixon & Vanderhye P.C.

(57) ABSTRACT

An apparatus and method are provided for storing source operands for operations. The apparatus comprises execution circuitry for performing operations on data values, and a register file comprising a plurality of registers to store the data values operated on by the execution circuitry. Issue circuitry is also provided that has a pending operations storage identifying pending operations awaiting performance by the execution circuitry and selection circuitry to select pending operations from the pending operation storage to issue to the execution circuitry. The pending operations storage comprises an entry for each pending operation, each entry storing attribute information identifying the operation to be performed, where that attribute information includes a source identifier field for each source operand of the pending operation. The source identifier field has a field size sufficient to enable a register identifier to be stored within the source identifier field to identify the register used to store the data value forming the source operand. However, the field size is insufficient to store the data value as stored in the register. Value analysis circuitry is responsive to the execution circuitry generating a data value that will be used as a source operand for a pending operation, to determine whether a reduced size representation of that generated data value can be accommodated within the associated source identifier field of the entry for that pending operation. If so, the reduced size representation is generated and a control signal is issued to the issue circuitry to cause the register identifier for that source operand to be replaced by the reduced size representation of the data value. By such an approach, it is possible to increase the performance of the apparatus and/or to simplify the construction of the register file.

18 Claims, 9 Drawing Sheets

APPARATUS AND METHOD FOR STORING SOURCE OPERANDS FOR OPERATIONS

BACKGROUND

The present technique relates to an apparatus and method for storing source operands for operations to be performed by execution circuitry of a data processing apparatus.

In modern data processing systems, it is known to provide issue circuitry to maintain a record of pending operations awaiting performance by the execution circuitry. For example, such a structure is often used in out-of-order processors to maintain a record of the pending operations that are awaiting issuance to the execution circuitry. When all of the data values required as source operands for a pending operation are available, the issue circuitry can then select that pending operation to be issued to the execution circuitry. Typically the record maintained by the issue circuitry for each pending operation incorporates register identifiers to identify each register holding one of the required source operands, and the register file is then accessed at the time the operation is to be issued to the execution circuitry in order to obtain the required data values from those registers. However, as systems increase in complexity, and hence may for example allow multiple operations to be dispatched to the execution circuitry in a particular clock cycle, this can require significant complexity in the construction of the register file, in particular to provide sufficient read ports to enable all of the required source operands to be retrieved. If an insufficient number of read ports are provided, then this can impact performance, since it may take more cycles to obtain the required source operands before the operation can be executed.

Whilst the data values could in principle be retrieved from the register file and stored within the record structure maintained by the issue circuitry prior to a pending operation being selected for issuance to the execution circuitry, this would significantly increase the storage requirements and complexity of the issue circuitry, since such data values will typically be significantly larger than the register identifiers required to identify a register containing those values.

Accordingly, it would be desirable to provide an improved mechanism for storing source operands for operations to be performed on execution circuitry of a data processing apparatus.

SUMMARY

In one example configuration, there is provided an apparatus comprising: execution circuitry to perform operations on data values; a register file comprising a plurality of registers to store the data values operated on by the execution circuitry; issue circuitry comprising a pending operations storage identifying pending operations awaiting performance by the execution circuitry, and selection circuitry to select pending operations from the pending operations storage to issue to the execution circuitry; the pending operations storage comprising an entry for each pending operation, each entry storing attribute information identifying the operation to be performed, the attribute information comprising a source identifier field for each source operand of the pending operation, the source identifier field having a field size sufficient to enable a register identifier to be stored within the source identifier field to identify the register used to store the data value forming the source operand, but the field size being insufficient to store the data value as stored in the register; and value analysis circuitry responsive to the execution circuitry generating a data value that will be used as a source operand for a pending operation, to determine whether a reduced size representation of that generated data value can be accommodated within the associated source identifier field of the entry for that pending operation, and in that event to issue a control signal to the issue circuitry to cause the register identifier for that source operand to be replaced by the reduced size representation of the data value.

In another example configuration, there is provided a method of storing source operands in an apparatus comprising execution circuitry for performing operations on data values, and a register file comprising a plurality of registers for storing the data values operated on by the execution circuitry, the method comprising: providing a pending operations storage identifying pending operations awaiting performance by the execution circuitry, the pending operations storage comprising an entry for each pending operation, each entry storing attribute information identifying the operation to be performed, the attribute information comprising a source identifier field for each source operand of the pending operation, the source identifier field having a field size sufficient to enable a register identifier to be stored within the source identifier field to identify the register used to store the data value forming the source operand, but the field size being insufficient to store the data value as stored in the register; determining, responsive to the execution circuitry generating a data value that will be used as a source operand for a pending operation, whether a reduced size representation of that generated data value can be accommodated within the associated source identifier field of the entry for that pending operation; and in the event that the reduced size representation can be accommodated, issuing a control signal to the issue circuitry to cause the register identifier for that source operand to be replaced by the reduced size representation of the data value.

In a yet further example configuration, there is provided an apparatus comprising: execution means for performing operations on data values; register file means comprising a plurality of registers for storing the data values operated on by the execution means; issue means comprising a pending operations storage for identifying pending operations awaiting performance by the execution means, and selection means for selecting pending operations from the pending operations storage to issue to the execution means; the pending operations storage comprising an entry for each pending operation, each entry storing attribute information identifying the operation to be performed, the attribute information comprising a source identifier field for each source operand of the pending operation, the source identifier field having a field size sufficient to enable a register identifier to be stored within the source identifier field to identify the register used to store the data value forming the source operand, but the field size being insufficient to store the data value as stored in the register; and value analysis means for determining, in response to the execution means generating a data value that will be used as a source operand for a pending operation, whether a reduced size representation of that generated data value can be accommodated within the associated source identifier field of the entry for that pending operation, and in that event to issue a control signal to the issue means to cause the register identifier for that source operand to be replaced by the reduced size representation of the data value.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
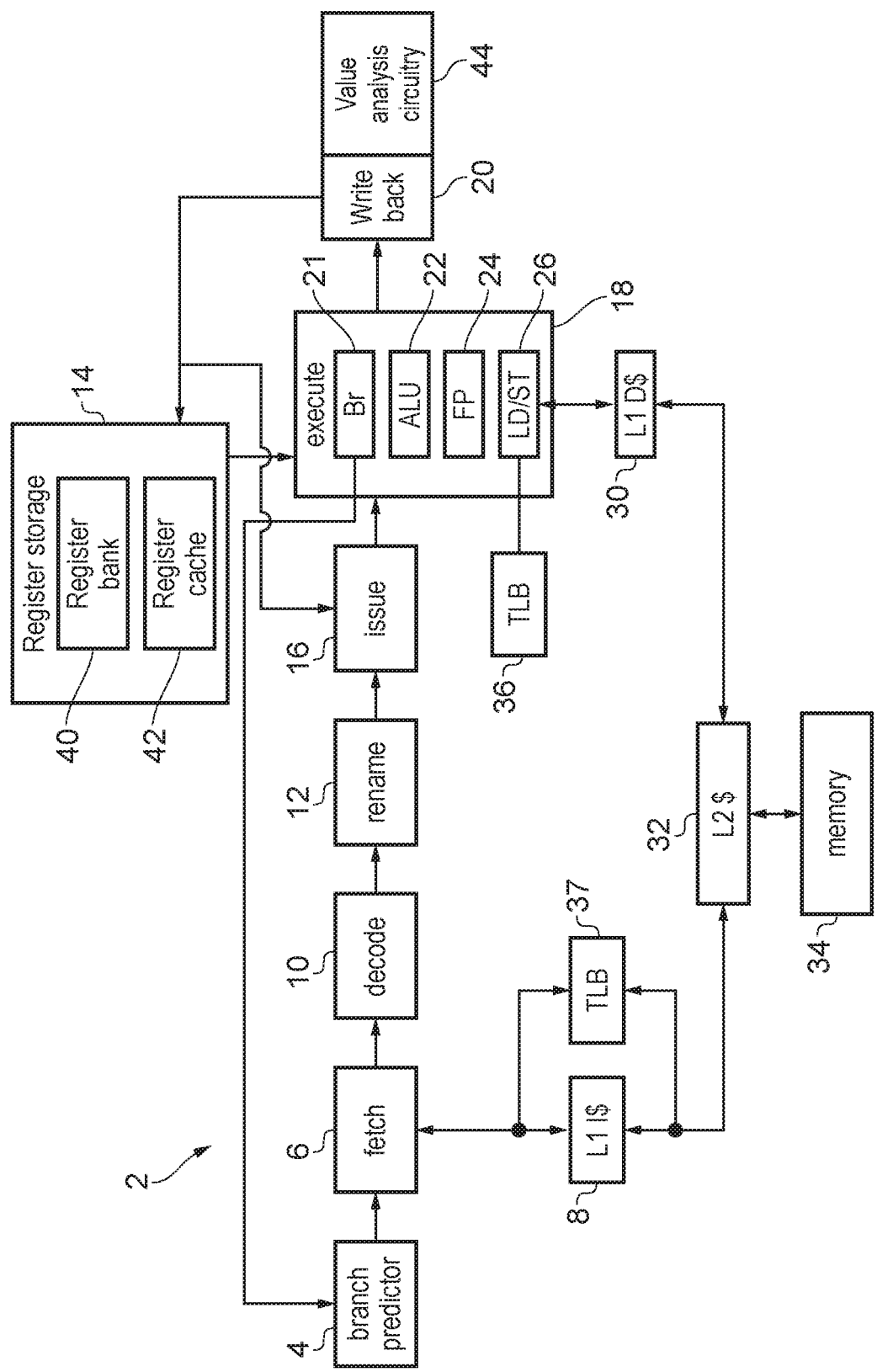
FIG. 1 is a block diagram of a data processing apparatus in accordance with one example.

In one example an apparatus is provided that has execution circuitry for performing operations on data values, and a register file comprising a plurality of registers to store the data values operated on by the execution circuitry. Issue circuitry is also provided that comprises a pending operations storage identifying pending operations awaiting performance by the execution circuitry, and selection circuitry to select pending operations from the pending operations storage to issue to the execution circuitry. A number of criteria can be applied by the selection circuitry to determine when a pending operation identified within the pending operations storage is available to be selected for issuance to the execution circuitry. However, in one example, it is necessary for all of the data values that are to be used as source operands for that pending operation to be available for provision to the execution circuitry before the selection circuitry is able to select that pending operation for issuance.

The pending operations storage comprises an entry for each pending operation, where each entry stores attribute information identifying the operation to be performed. The attribute information can take a variety of forms, but in one example implementation includes a source identifier field for each source operand of the pending operation. The source identifier field has a field size sufficient to enable a register identifier to be stored within the source identifier field to identify the register used to store the data value forming the source operand. However, the field size is insufficient to store the data value as stored in the register. In some instances, the field size will be just sufficient to enable a register identifier to be stored, but in an alternative implementation the field size could be somewhat larger than is strictly required to enable the register identifier to be stored, but will still be less than the size that would be required to store the data value.

The apparatus further provides value analysis circuitry that is responsive to the execution circuitry generating a data value that will be used as a source operand for a pending operation, to determine whether a reduced size representation of that generated data value can be accommodated within the associated source identifier field of the entry for that pending operation. If so, then that reduced size representation is generated, and a control signal is issued to the issue circuitry to cause the register identifier for that source operand to be replaced by the reduced size representation of the data value.

In the event that there are multiple pending operations that will all use that particular generated data value as a source operand, then within each of the entries for those multiple pending operations, the relevant source identifier field can be updated so that the register identifier is overwritten by the reduced size representation of the data value.

By such an approach, when the selection circuitry subsequently selects such a pending operation for issuance to the execution circuitry, then the reduced size representation of the data value can be used to reproduce the required data value without needing to access the register file. This can alleviate the potential bottleneck that can arise due to the limited number of read ports provided for the register file, since the register file needs accessing less than would be the case if all of the source operands needed to be obtained from the register file at the time a pending operation is issued to the execution circuitry.

There are a number of ways in which a record can be kept as to whether a source identifier field contains a register identifier or a reduced size representation of a data value, but in one example implementation each entry comprises a source type identifier used for that purpose. In particular, the source type identifier can take a first value when the source identifier field stores a register identifier, and a second value when the source identifier field stores a reduced size representation of a data value. In one particular implementation, a source type identifier is provided in association with each source identifier field of each entry.

In one example the apparatus further comprises data value reconstruction circuitry to reconstruct a data value from a reduced size representation of that data value stored in a source identifier field. The data value reconstruction circuitry can be provided at a variety of locations within the apparatus, but in one example implementation is provided in association with the selection circuitry, so that when a pending operation is selected from the pending operations storage by the selection circuitry, the data value reconstruction circuitry can be invoked as required to reconstruct a data value from a reduced size representation of that data value if such a reduced size representation is stored within the entry for that selected pending operation.

In one example implementation, the value analysis circuitry is arranged to generate the reduced size representation by applying an encoding operation to the data value, and the data value reconstruction circuitry is arranged to apply a corresponding decoding operation to reconstruct the data value. Hence, based on knowledge of the encoding operation that has been applied by the value analysis circuitry, the data value reconstruction circuitry can then reverse the effects of the encoding operation in order to reconstruct the data value.

Whilst the encoding operation and associated decoding operation can be selected as desired based on a particular implementation, it has been found that in many instances only a relatively simple encoding operation and associated decoding operation is required in order to enable a significant number of the most commonly used data values to be stored as a reduced size representation within the entries of the pending operations storage.

In particular, in one example, the value analysis circuitry may be arranged to determine that a reduced size representation of the generated data value can be accommodated within a source identifier field when a plurality of determined bits of the generated data value have a defined value. The encoding operation applied by the value analysis circuitry is then arranged to generate the reduced size representation by removing the determined bits, and the decoding operation applied by the data value reconstruction circuitry is arranged to reintroduce the determined bits with the defined value. Hence, in such examples, the encoding operation merely involves removing certain bits from the data value and the corresponding decoding operation then reintroduces those determined bits. Typically the values to allocate to those reintroduced bits can be directly derived from the value of at least one bit remaining within the reduced size representation.

For example, in one implementation, the plurality of determined bits are a determined number of most significant bits of the data value, the defined valued for the plurality of determined bits is all zeros, the encoding operation removes the plurality of determined bits, and the decoding operation zero extends the reduced size representation in order to reintroduce the plurality of determined bits.

As another example, the plurality of determined bits may be a determined number of most significant bits of the data value, the defined valued for the plurality of determined bits is all zeros or all ones, the encoding operation removes the plurality of determined bits, and the decoding operation sign extends the reduced size representation in order to reintroduce the plurality of determined bits.

Hence, in both of the above examples, the encoding operation merely involves detection of a situation where the determined number of bits all have the same value, and the removal of those bits, with the corresponding decode operation then using simple zero extension or sign extension processes to recreate the data value. It has been found that the circuitry required to implement the value analysis circuitry and the data value reconstruction circuitry in such instances is small, providing a particularly efficient implementation.

However, there is no requirement to restrict the encoding and decoding schemes to the above described schemes, and any chosen encoding scheme and associated decoding scheme could be used if desired, in order to identify a subset of the possible data values that are to be represented in the reduced size representation.

In one example, a single encoding operation is supported by the value analysis circuitry. In such an instance, it is predetermined what decoding operation needs to be performed by the data value reconstruction circuitry, hence providing a particularly simple and effective implementation.

However, if desired, a plurality of encoding operations may be supported by the value analysis circuitry. In such situations, when a reduced size representation of a data value is stored within a source identifier field of an entry, the entry is arranged to also maintain an indication of the encoding operation used to produce that reduced size representation, so as to enable the data value reconstruction circuitry to determine the corresponding decoding operation to be applied to reconstruct the data value. In particular, when it is necessary to reconstruct the data value, that indication of the encoding operation can be provided to the data value reconstruction circuitry in order to determine how the data value should be reconstructed. For example, if both the zero extension and sign extension forms discussed earlier were supported, then a flag could be maintained within each entry to identify whether a particular reduced size representation was produced taking account of the zero extension mechanism or the sign extension mechanism, so that the data value reconstruction circuitry can determine whether to zero extend the reduced size representation in order to reproduce the data value, or instead to sign extend the reduced size representation in order to reproduce the data value.

In one example, each entry further stores control information to identify when the pending operation is available for selection by the issue circuitry, the control information identifying when each data value forming a source operand of the pending operation is available to provide to the execution circuitry, and the selection circuitry being able to select a pending operation for issuance to the execution circuitry once the control information identifies that the data values forming all source operands of that pending operation are available to provide to the execution circuitry. By maintaining control information in association with each entry this provides an efficient mechanism for enabling the selection circuitry to determine when pending operations are available for issuance to the execution circuitry.

A data value can become available to provide to the execution circuitry via a number of mechanisms. For example, that data value may be loaded into the register file from memory, may be a data value generated by the execution circuitry and written into the register file, a data value output over a forwarding path to the execution circuitry, etc.

In one example implementation, as operations generating data values are performed by the processing circuitry, feedback information is provided to the issue circuitry to enable the control information for the entries in the pending operations storage to be updated. Hence, for example, the register identifier associated with a generated data value can be provided to the issue circuitry, and for each entry any source identifier field identifying that register can then be considered to be associated with a data value that is available, and the control information for that entry can be updated accordingly.

In one such implementation, the value analysis circuitry is arranged to generate the reduced size representation of the generated data value for provision to the issue circuitry in association with the feedback information relating to that generated data value. Hence, when it is possible to provide a reduced size representation for a generated data value, that reduced size representation can be passed back to the issue circuitry in association with the feedback information relating to the generated data value. Hence, in addition to the control information being updated, the issue circuitry can also overwrite the register identifier with the reduced size representation in the relevant source identifier field for any pending operations that use that generated data value as a source operand.

There are a number of ways in which the reduced size representation can be associated with the feedback information. For example, the reduced size representation could be provided at the same time as the feedback information, or alternatively could be provided one or more cycles later, but using a mechanism that links the reduced size representation with the feedback information. This may for example involve providing the reduced size representation within the same feedback channel as the feedback information, or could involve resending the register specifier at the time the reduced size representation is passed to the issue circuitry.

In some implementations, the apparatus may further comprise a register cache comprising a plurality of cache entries and arranged to cache a subset of the data values, each cache entry arranged to store a data value and indication of the register associated with that cached data value. By the use of such a register cache, it is possible to obtain quicker access to data values that are held within the register cache, whilst also avoiding the need to access the register file itself. The register cache will be provided with a number of read ports, and hence in combination with the register file provides an increase in the total number of data values that can be read during the same clock cycle. By use of the earlier-mentioned technique to store reduced size representations of certain data values within the pending operations storage of the issue circuitry, this can alleviate the pressure on the read ports of both the register cache and the associated register file. Further, it can reduce pressures on the write ports of the register cache. In particular, whilst generated result values produced by the execution circuitry do need to be written into the register file, they do not need to be written into the register cache. Hence, by way of example, the register cache can be arranged to avoid allocating cache entries for a data value having a reduced size representation stored within the pending operations storage. In particular, since it known that the data value in question can be reproduced from the reduced size representation, it is known that there will be no need to access that data value from the register resources, and accordingly there is no need to seek to store that data value in the register cache. Such an approach can hence increase the effective size of the register cache by filtering out data values that are represented by reduced size representations within the pending operations storage, hence making the entries of the register cache available for other data values.

There are a number of ways in which the entries in the pending operations storage can be populated. In one particular example implementation, the apparatus further comprises decode circuitry to decode instructions in order to produce decode information identifying the operations to be performed by the execution circuitry, and the entries in the pending operations storage are populated based on the decode information produced by the decode circuitry. Hence, the issue circuitry resides between the decode circuitry and the execution circuitry, and is used to buffer pending operations whilst they are waiting to be issued to the execution circuitry. Through use of such an arrangement, it is possible to implement out-of-order processing of instructions through use of the issue circuitry structures. In particular, the instructions do not need to be executed in the same order that they are received by the decode circuitry, and instead the operations required to implement the various instructions can be selected from the pending operation storage in any order, subject to any ordering constraints that are in place.

In one example out-of-order implementation, the instructions identify architectural registers and the apparatus further comprises rename circuitry to map those architectural register to the registers in the register file, the registers in the register file forming physical registers, and the number of physical registers exceeding the number of architectural registers. Each source identifier field in the entries of the pending operations storage is arranged to store a register identifier identifying a physical register unless that register identifier is replaced by a reduced size representation of the associated data value. By use of the rename circuitry, any false dependencies due to the way the architectural registers are specified by the various instructions can be removed, and instead the operations can be executed once the required source operands for those operations are available.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. In particular the decoding of an instruction may identify one or more operations to be performed by the execute stage in order to implement execution of the instruction (such operations may also be referred to in some implementations as micro-operations or micro-ops).

A rename stage 12 performs register renaming to map architectural register specifiers identified by the instructions to physical register specifiers identifying registers provided in hardware in a register bank 40 of register storage 14. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction.

An issue stage 16 queues operations determined by the decoded instructions until the required source operands for processing those operations are available (for example by being stored in the registers 40). Once the source operands are available for an operation, that operation may be issued to the execute stage 18, to enable the execute stage to perform the operation in order to execute the corresponding instruction. A writeback stage 20 writes results of the executed instructions back to the registers of the register bank 40.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 40 or store operations to store data from the registers 40 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

As systems increase in complexity, for example by allowing out-of-order execution of instructions, the size and complexity of the register storage 14 has increased. For example, the number of registers provided within the register storage 14 may increase, and multiple register banks 40 may be provided to support those registers. There has also tended to be an increase in the number of read and write ports provided for the register bank(s).

As the register bank(s) increase in size and complexity, the time taken to access registers can become significant, and potentially place a timing limitation on performance of the processor. With the aim of seeking to alleviate the timing constraint, it is known to provide a register cache 42 within the register storage 14 to cache a subset of the data held within the register bank(s) 40. The processor can then attempt to access the required data in the register cache, and only in the event that the data is not in the register cache will an access to the register bank(s) be required.

Whilst the use of a register cache 42 can assist in improving access times to data stored in registers, those access times can still place a constraint on throughput. For instance, at the time all of the source operands that form an operation are available to provide to the execute stage 18, it may be necessary to obtain the data values forming those source operands from the relevant registers within the register bank 40, or obtain cached copies if they are available within the register cache 42. Typically, the issue queue entries for each operation can provide register identifiers identifying the registers holding the data values to be used as source operands, and those register identifiers can be used to access the appropriate storage within the register storage 14 in order to obtain the data values. However, this process can impact the speed with which the operation can be ready to be performed by the execute stage.

In accordance with the techniques described herein, a mechanism is provided that selectively enables reduced size representations of certain data values that are to be used as source operands to be stored directly within the relevant entry for the pending operation in the issue queue 16, avoiding the need to access the register storage 14 for such a source operand when an operation using that source operand is issued from the issue circuitry 16 to the execute stage 18. This can significantly improve performance without significantly increasing the size and complexity of the issue circuitry 16. In particular, as will be discussed herein, value analysis circuitry 44 can be provided to analyse a result value produced by the execute stage 18 in order to determine whether a reduced size representation of that generated result value can be accommodated within a source identifier field of a pending operation entry within the issue circuitry 16. If it can, then that reduced size representation can be generated and provided to the issue circuitry 16. That reduced size representation will be provided in such a way that the issue circuitry also knows which register will be storing the full size representation of the result value. It can then perform a lookup in its pending operations queue in order to identify any source identifier fields that include a register identifier for that register, and in that instance can replace the register identifier with the reduced size representation of the data value.

Then, at the time a pending operation is selected from the pending operations queue, if one or more of the source identifier fields include a reduced size representation of a data value rather than the register identifier, there is no need for any access to be made to the register storage 14 in respect of those source operands. Instead, data value reconstruction circuitry (also referred to herein as source value reconstruction circuitry) can be provided to recreate the full size data value from the reduced size representation, and to provide that full size data value to the execute stage 18. This can significantly alleviate the constraints on the register storage 14, for example reducing the number of read ports required. Alternatively, by alleviating the constraints, the register storage could be provided with the same number of read ports but the technique would allow an overall increase in throughput, due to the reduced requirements to access the register storage, hence for example potentially allowing more operations to be issued in parallel to the execute stage 18 from the issue circuitry 16.

The value analysis circuitry 44 can be provided at any appropriate location within the apparatus, but as shown in FIG. 1, in one example implementation is provided in association with the writeback stage 20. This enables the determination to be made prior to the data value being written back to the register storage 14, and hence potentially enables different actions to be taken in respect of the register storage dependent upon whether a reduced size representation of the result value is possible or not. For example, whilst it will typically be necessary to store the full result value back to the register bank 40, so that it is available for subsequent operations, it may be possible to avoid using the register cache 42 for any data values where a reduced size representation has been produced. In particular, it will be known that for the relevant pending operations in the issue circuitry 16, the reduced size representation of the data value will be stored directly within the entries of the issue circuitry tracking those pending operations, and accordingly those source operands will not need to be obtained from the register storage, and hence no performance benefit would be realised by caching the corresponding full sized data values within the register cache 42.

Figure 2:
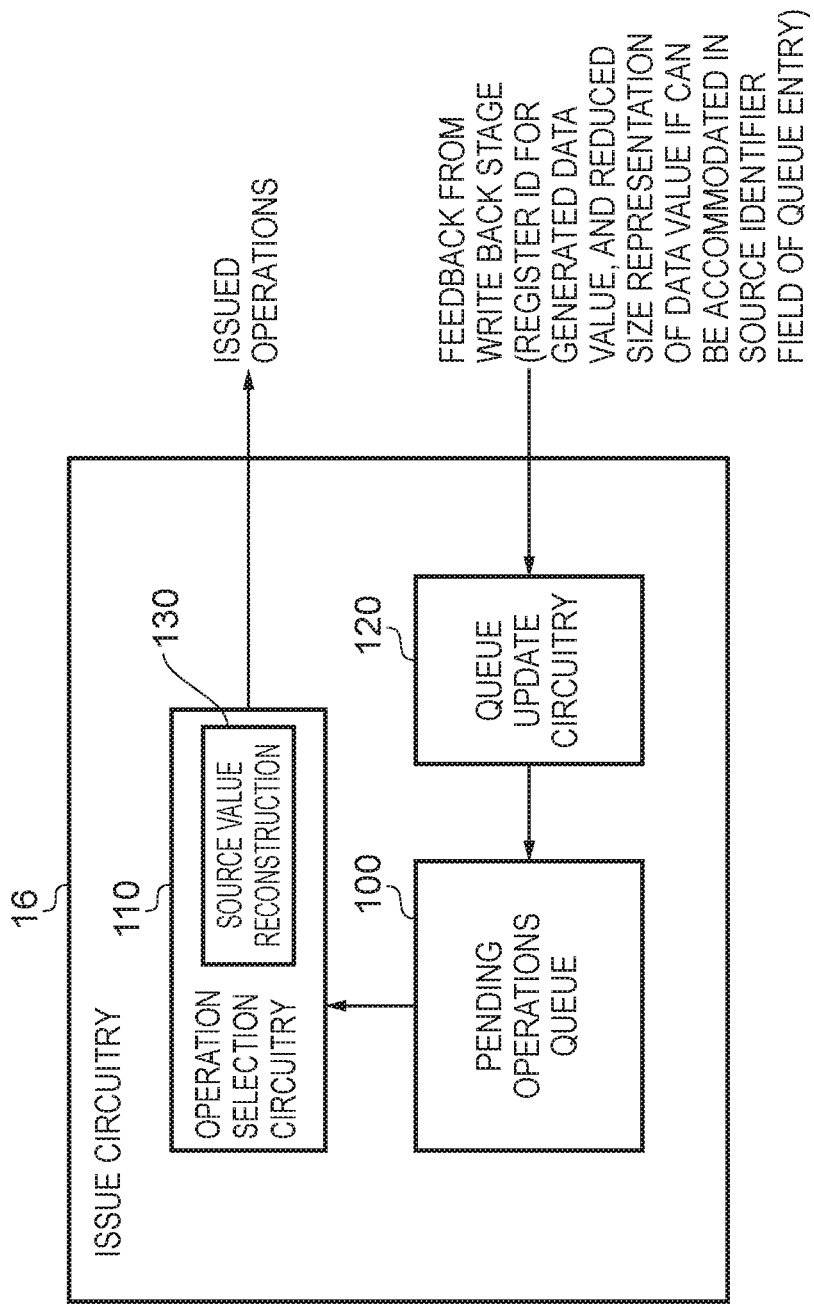
FIG. 2 is a block diagram illustrating in more detail components provided within the issue circuitry of FIG. 1 in one example.

FIG. 2 is a block diagram illustrating in more detail some components provided within the issue circuitry 16. A pending operations queue 100 is provided that has a plurality of entries, each entry being arranged to store information pertaining to a pending operation that is awaiting issuance to the execute stage 18. In accordance with the pipeline structure shown in FIG. 1, an entry will be allocated within the pending operations queue 100 for each operation forwarded along the pipeline from the decode stage 10 (via the rename stage 12 where such a rename stage is used).

Figure 3:
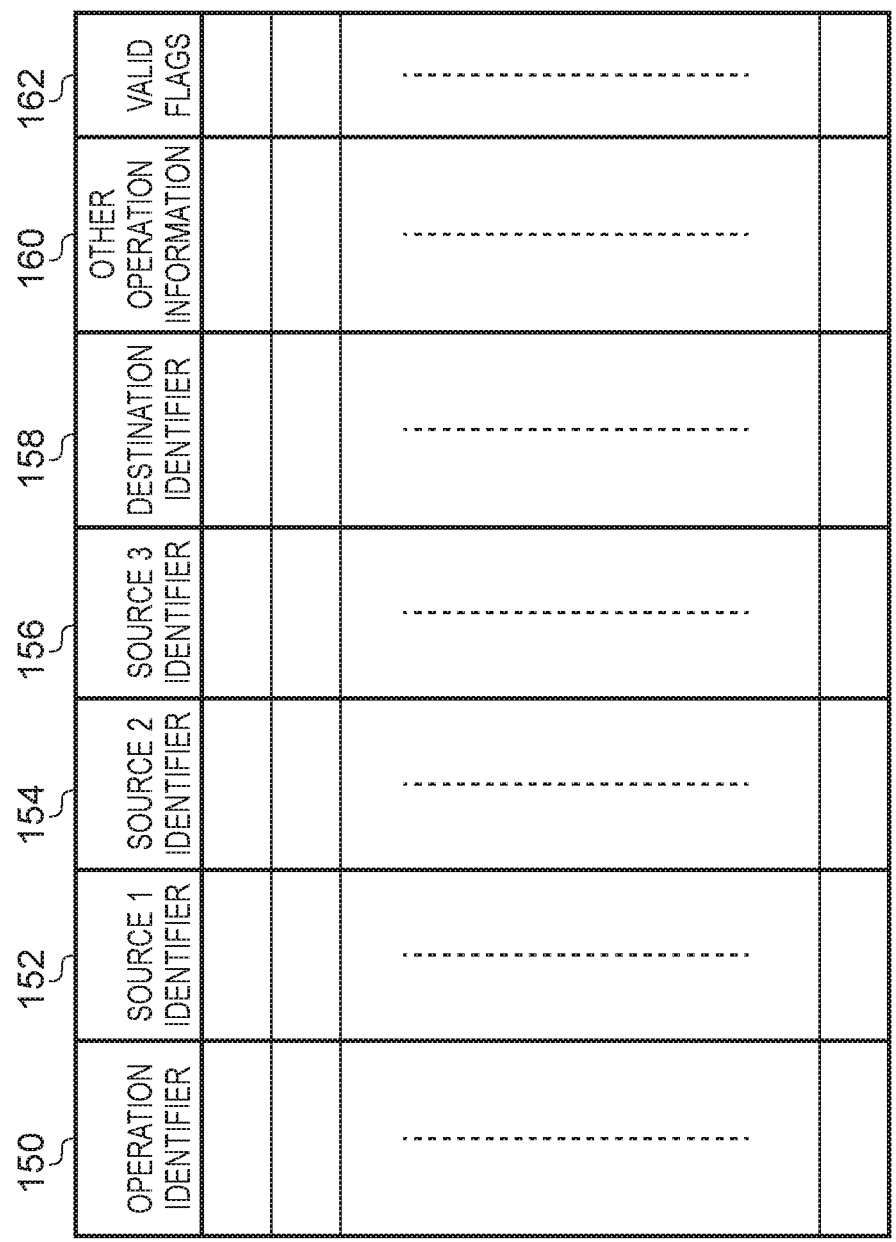
FIG. 3 illustrates the format of the entries that may be provided within the pending operations queue of FIG. 2 in one example.

FIG. 3 illustrates in more detail various information that may be provided within each entry of the pending operations queue. An operation identifier 150 can be used to identify the type of operation that needs to be performed, for example an add operation, a multiply-accumulate operation, etc. Each entry will also capture information 152, 154, 156 about each of the source operands. In the example of FIG. 3, it is assumed that at most there will be three source operands, but the actual maximum number of source operands may vary dependent on implementation. Whether the maximum number of source operands are used for any particular operation will depend on the type of operation being performed. For example, an add operation may use two source operands, whilst a multiply-accumulate operation may use three source operands (although in one implementation the third source operand in that instance is the current content of a destination register for the result). A set of valid flags 162 can be provided in association with each entry, to identify whether the various pieces of information provided for each entry are valid or not. Hence, for an operation that only uses two source operands, those valid flags may identify that the source identifiers 152 and 154 are valid but the source identifier 156 is not valid.

Each entry also captures information 158 identifying a destination to which the result value is to be written. This will typically take the form of a register identifier identifying a register within the register bank 40 to which the result value is to be written. Other operation information 160 may also be provided within the entry, for example to capture ancillary information, such as the number of clock cycles that will be required to perform the operation once it has been issued to the execute stage 18, an indication of the state of the operation with respect to any speculation being performed, for example whether in the event of a misprediction the operation is not required, etc.

Figure 4:
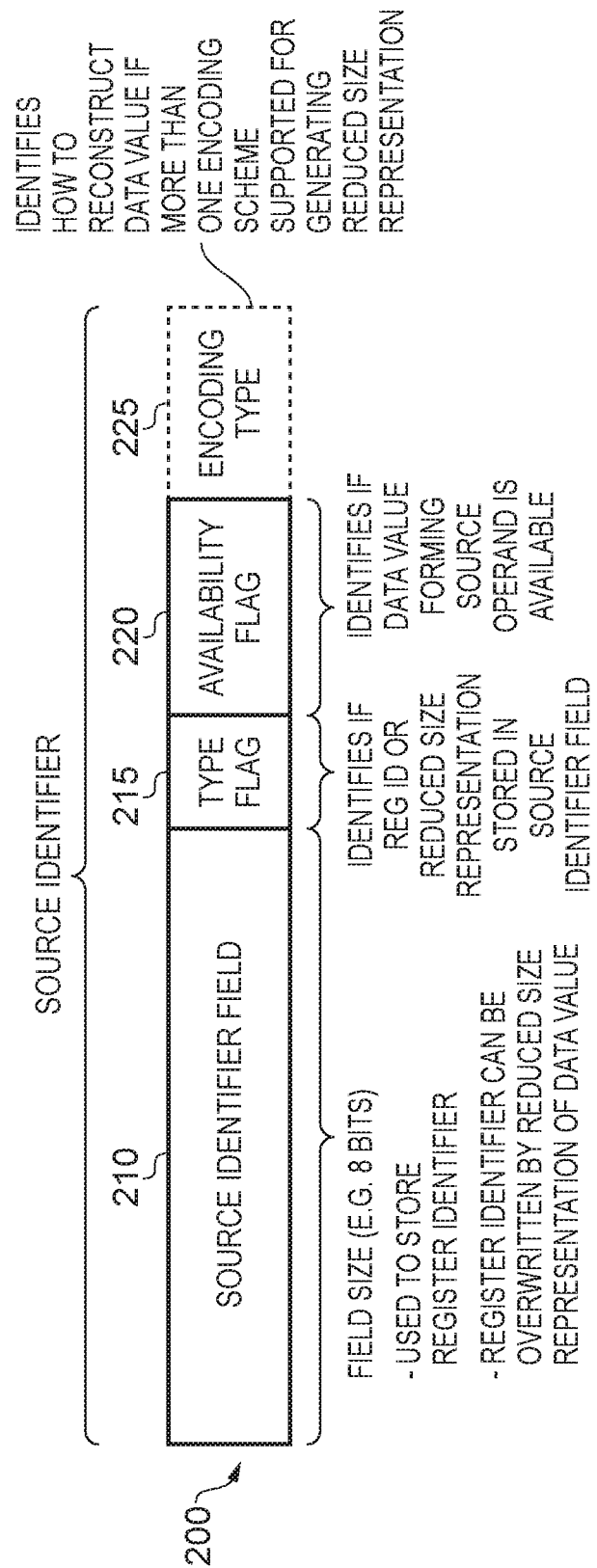
FIG. 4 illustrates in more detail information provided within each source identifier of an entry of the pending operations queue in one example.

FIG. 4 illustrates in more detail each item of source identifier information 200 (for example the source identifiers 152, 154, 156 shown in FIG. 3). A source identifier field 210 is provided which initially is arranged to store a register identifier identifying a register within the register bank 40 that is to store the data value that will be used as a source operand. That data value may or may not already be stored within that register, since for example that data value may itself be a result value generated by an operation that has not yet completed.

As mentioned earlier, when the result value is produced, the value analysis circuitry 44 will determine whether a reduced size representation of the data value can be stored within the source identifier field 210. This may only be possible for a subset of possible data values. For example, the registers within the register bank 40 may be significantly larger than the size of the source identifier field. In one particular example, each register may be 64 bits in length, whilst the source identifier field may be only 8 bits. However, in some instances, the value analysis circuitry 44 will determine that a reduced size representation of the data value can be contained within the source identifier field, the reduced size representation being such that the full size data value can then be reconstructed from it at a later point. In that event, the reduced size representation will be generated by the value analysis circuitry and provided to the issue circuitry, so that it can be used to overwrite the register identifier in the source identifier field 210.

A type flag 215 is provided whose value indicates whether the source identifier field 210 holds a register identifier, or instead holds a reduced size representation of a data value. This hence enables the content of each source identifier field 210 to be interpreted at a time the issue circuitry 16 decides that the corresponding operation can be issued to the execute stage 18.

An availability flag 220 is provided to identify when the data value forming the source operand is available for provision to the execute stage. This can occur for example when the data value is stored within the relevant register of the register bank 40, with the register identifier in the source identifier field identifying that register. Alternatively the availability flag may be set when a reduced size representation of the data value is stored in the source identifier field 210. As another example, one or more forwarding paths may be used, whereby results output to the writeback stage can be forwarded directly back into the execute stage 18, in parallel with the result data value being written back to the register bank, and if a forwarding path is available for the result, then again the availability flag 220 may be set.

The manner in which reduced size representations of data values may be generated will be discussed in more detail later. In essence, the value analysis circuitry 44 performs a form of encoding operation to produce the reduced size representation from the full data value, and then the source value reconstruction circuitry applies a corresponding decoding operation to reverse the effects of the encoding operation, in order to reproduce the full size data value. Whilst in principle any suitable encoding operation and associated decoding operation can be used, it has been found that in many instances only a very simple encoding operation and associated decoding operation is required in order to allow a significant number of commonly used values to be stored in a reduced size form within the source identifier field 210. For example, in one implementation, the value analysis circuitry looks for situations where a certain number of most significant bits of the data value are all the same value, the encoding operation merely then involving the removal of those bits, with the corresponding decoding operation then performing zero extension or sign extension to recreate the full size data value.

If only one encoding operation is supported by the value analysis circuitry, then the decoding operation required is fixed, and no information about the encoding needs to be captured. However, if multiple different encoding options are supported for the value analysis circuitry 44, then an encoding type field 225 can be provided in association with each source identifier 200 to identify the type of encoding that has been used to produce the reduced size representation stored within the source identifier field 210. This information can then be used by the source value reconstruction circuitry to decide how to recreate the full size data value.

Returning to FIG. 2, queue update circuitry 120 is provided in association with the pending operations queue 100 so that when feedback is provided from the writeback stage 20 and the associated value analysis circuitry 44, the relevant information within each entry can be updated. Hence, in accordance with a standard feedback mechanism, a register identifier identifying the register at which a result value is being written can be forwarded to the issue circuitry. Wherever an entry includes within one of its source identifier fields 210 that register identifier, then the corresponding availability flag 220 can be set to identify that the data value is available for provision to the execution circuitry, since it is known that the data will be available from the appropriate register. However, if in addition a reduced size representation of the data value in question is provided as part of the feedback information, then the queue update circuitry 120 can be used to identify those entries containing the corresponding register identifier in the source identifier field, and can cause that register identifier to be overwritten by the reduced size representation of the data value. At that point, the type flag 215 will also be updated to identify that the corresponding source identifier field 210 contains a reduced size representation of the data value rather than a register identifier.

There are a number of ways in which the reduced size representation, when available, can be associated with the other parts of the feedback information. It could for example be provided at the same time as the register identifier for the result value, or alternatively could be provided one or more clock cycles later. In the latter case, a mechanism will be provided that links the reduced size representation with the corresponding register identifier. For example, the same feedback channel could be used for both the register identifier and the subsequently provided reduced size representation, or alternatively the register identifier could be resent at the time the reduced size representation becomes available. By allowing the register identifier to be propagated from the writeback stage before any associated reduced size representation of the data value has been generated by the value analysis circuitry, this ensures that there is no delay in updating the availability information maintained in each of the entries of the pending operations queue 100.

The operation selection circuitry 110 is arranged to analyse the contents of the pending operations queue, and in particular to determine which entries have all of their source operands available, as indicated by the state of the availability flag 220 provided for each item of source identifier information. Once all of the source operands are available, then that entry is a candidate for being selected, and normal arbitration schemes can be applied in order to determine which operation or operations to select in each cycle, based on the candidate operations for selection. Once the operation selection circuitry 110 selects an operation, then the source identifier information 152, 154, 156 is analysed in order to determine whether the corresponding source identifier fields 210 store a reduced size representation of the data value or a register identifier. If the reduced size representation of a data value is stored, then the source value reconstruction circuitry 130 is used to reconstruct the full sized data value, so that the full sized data value can be issued to the execute stage 18 in association with the other operation information extracted from the relevant entry of the pending operations queue. For any other source operands for which a reduced size representation is not available, then the data value may be provided via a forwarding path from the writeback stage, or alternatively will be obtained by accessing the register storage 14. In situations where the register storage 14 includes a register cache 42, then typically a lookup will first be performed in the register cache 42 to determine whether the data value in question is stored within the register cache, and if not the relevant register will be accessed within the register bank 40 in order to obtain the required data value.

Whilst in FIG. 2 only a single instance of issue circuitry 16 is shown, and indeed in some implementations there may only be a single instance of the issue circuitry, in alternative implementations multiple instances of the issue circuitry 16 may be provided, for example to provide different issue circuitry in association with one or more of the different execution units within the execute stage 18.

Figure 5A:
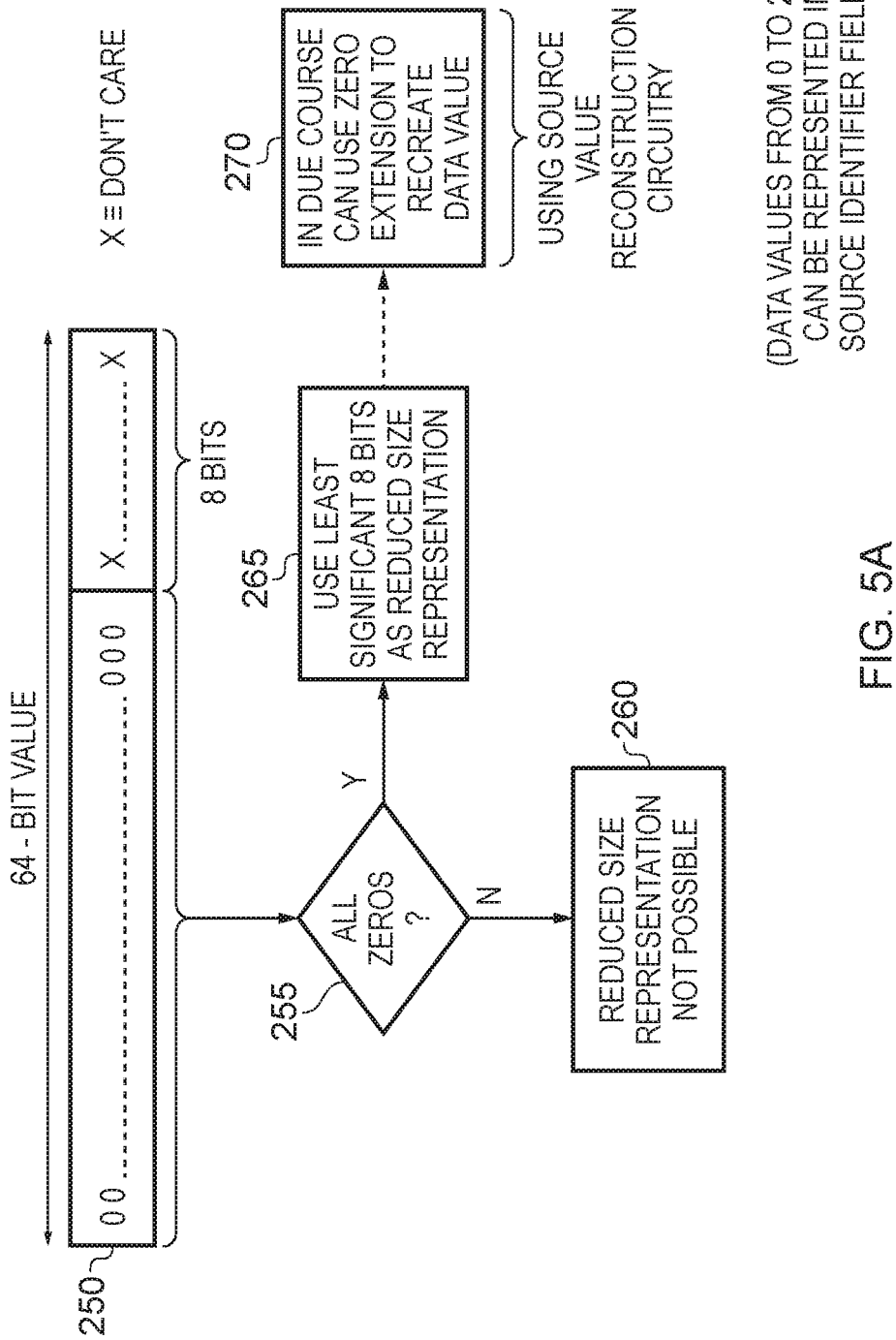
FIGS. 5A to 5C illustrate how the value analysis circuitry can be arranged to generate reduced size representations of data values in certain example situations.
Figure 5B:
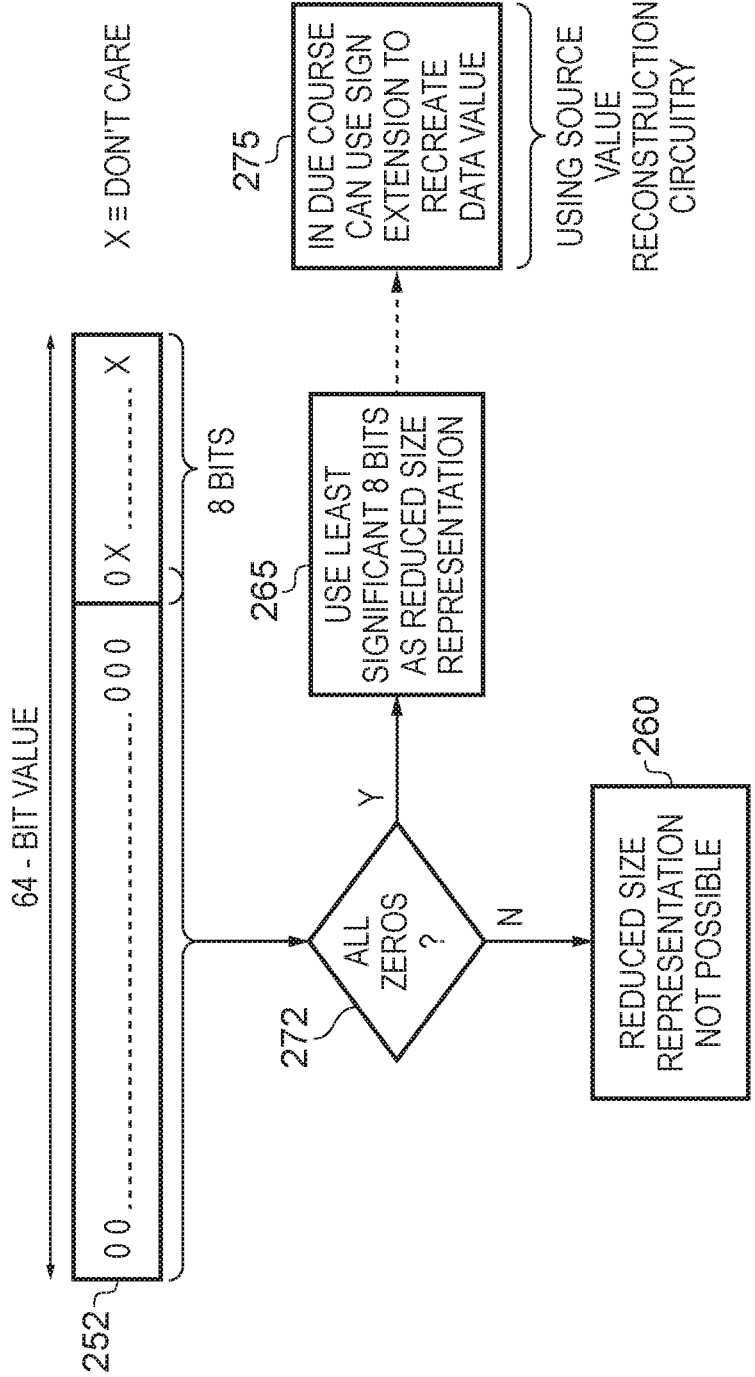
Figure 5C:
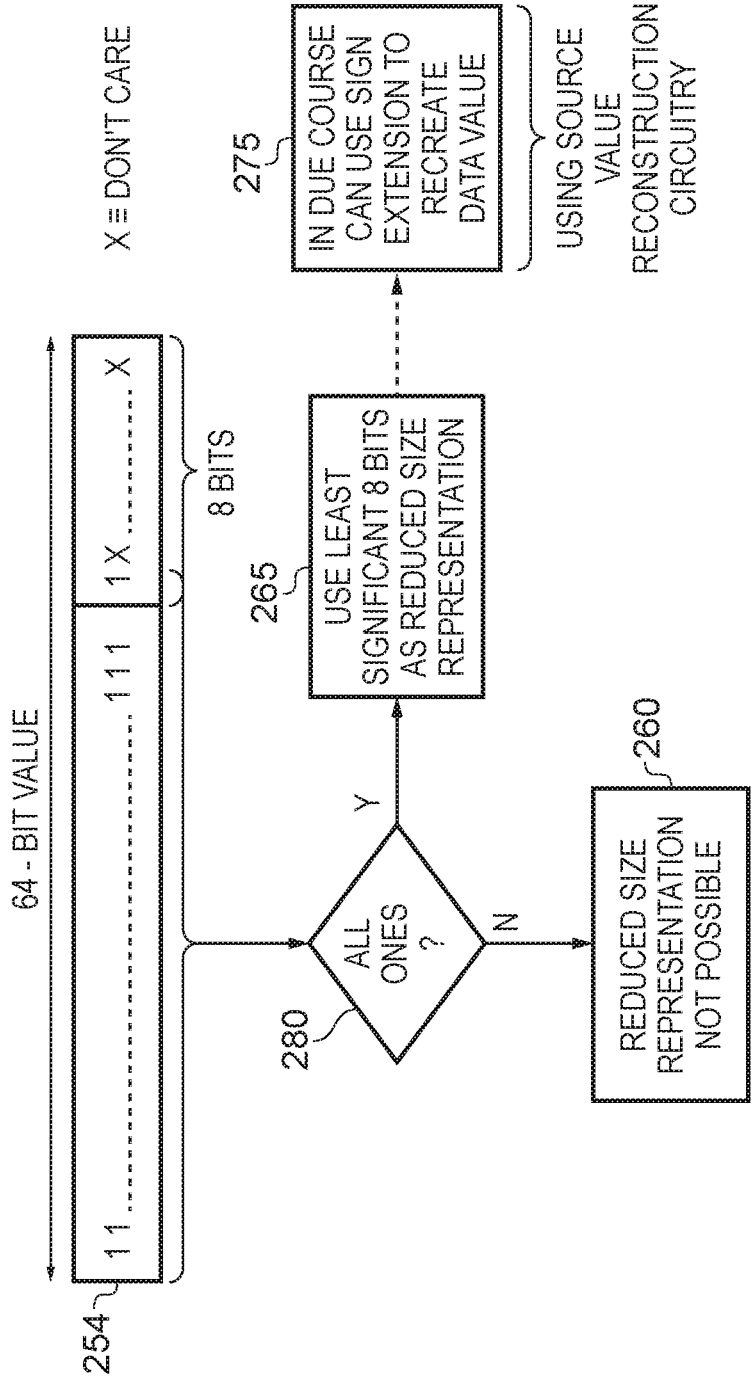

FIGS. 5A to 5C describe mechanisms that may be used by the value analysis circuitry 44 in order to determine whether a reduced size representation of a data value can be provided. FIG. 5A shows the example of a data value 250 with a certain number of leading 0s. In the particular example shown, it is assumed that the data value is a 64-bit value and that the 56 most significant bits are all 0s. This is assessed via the test 255, where it is determined whether those most significant bits are all 0s. If they are, then at step 265 the least significant 8 bits can be used as the reduced size representation. If any of the most significant 56 bits are not 0, then the process will proceed to step 260 where it will be determined that the reduced size representation is not possible.

In situations where the least significant 8 bits can be used as the reduced size representation, then as indicated by the box 270, in due course the source value reconstruction circuitry 130 can use a zero extension mechanism to recreate the data value. By such an approach, data values from 0 to 255 can be represented by a reduced size representation that will then fit within the source identifier field of an item of source identifier information within an entry of the pending operations queue.

FIGS. 5B and 5C illustrate an alternative mechanism that can be used, based on sign extension. Considering first FIG. 5B, it is determined at step 272 whether all of the 57 most significant bits of the data value 252 are 0s (including the most significant bit of the least significant 8 bits). If not, then no reduced size representation is possible and the process proceeds to step 260. However, otherwise the process proceeds to step 265 where the least significant 8 bits are used as the reduced size representation.

As indicated by step 275, in the event that the least significant 8 bits are used as the reduced size representation, then in due course the source value reconstruction circuitry can use sign extension to recreate the data value.

FIG. 5C illustrates the same process for a data value 254 where the relevant most significant bits are all 1s rather than all 0s. Hence, the test 272 of FIG. 5B is replaced by the test 280 of FIG. 5C, which determines whether the relevant number of most significant bits are all 1s (in this case the most significant 57 bits). By using the approach of FIG. 5B or 5C, it will be appreciated that data values from −128 to +127 can be represented by a reduced size representation within the source identifier field of an item of source identifier information within an entry of the pending operations queue.

Figure 6:
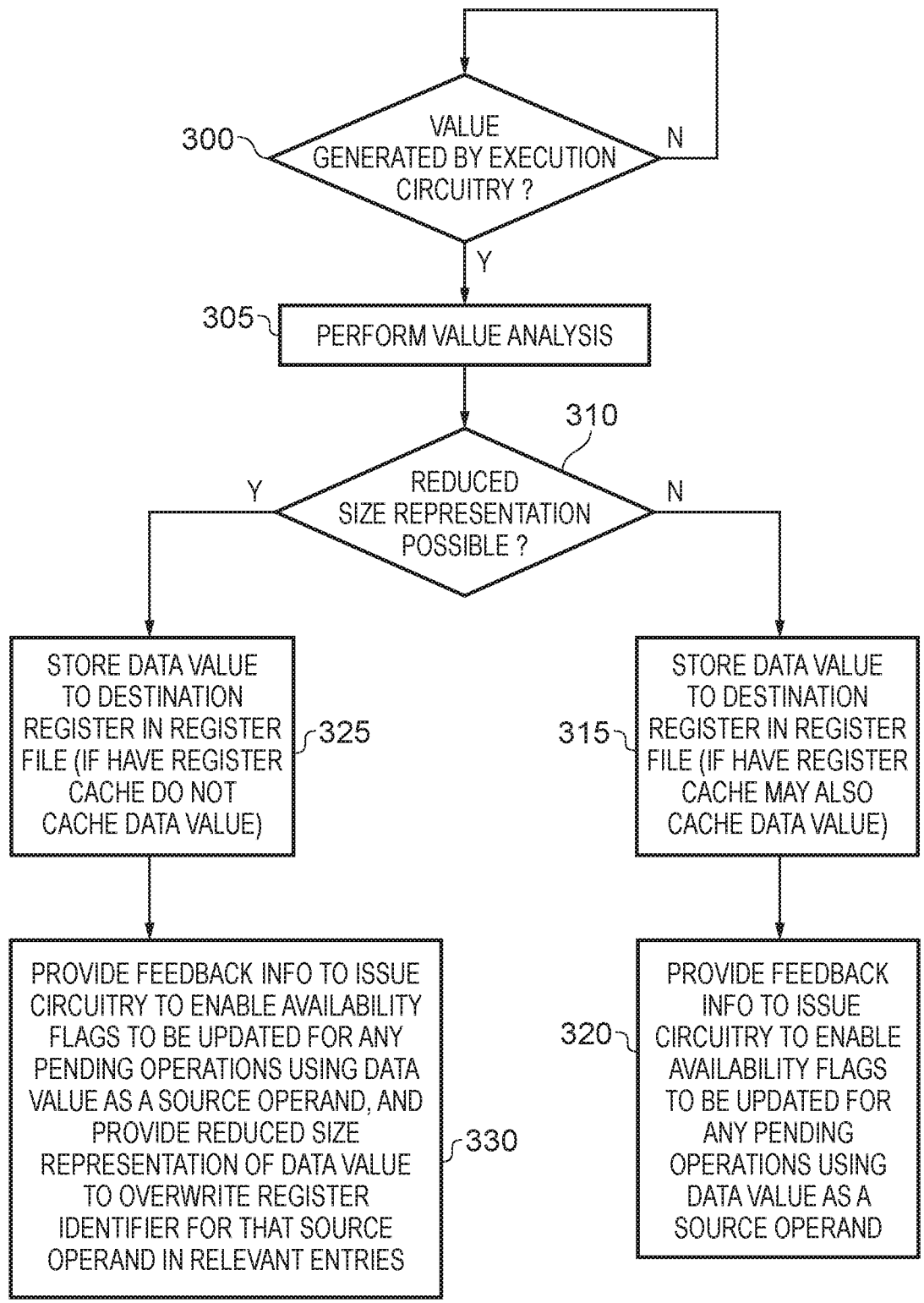
FIG. 6 is a flow diagram illustrating a sequence of steps that may be performed in one example implementation, when a value is generated by the execution circuitry.

FIG. 6 is a flow diagram illustrating a process performed in one example implementation to make use of the above described reduced size representation mechanism. At step 300, the process awaits generation of a value by the execution circuitry, and when such a value is generated this will be output to the writeback stage 20. Then, at step 305, the value analysis circuitry 44 performs a value analysis of the result value in order to determine at step 310 whether a reduced size representation is possible for the data value.

If not, the process proceeds to step 315, where the data value is output for storing in the appropriate destination register of the register bank (also referred to herein as the register file). If the register storage 14 incorporates a register cache, then that result value may also be cached within the register cache 42. It will be appreciated that a number of schemes can be applied to determine when it is appropriate to cache particular data values within the register cache, and any suitable scheme can be used here. As an example, if it is known that the result value is required as a source operand for one of the pending operations in the pending operations queue 100, then it may be written into the register cache 42, whereas otherwise it may be decided not to write the result value within the register cache.

In addition to step 315, at step 320 feedback information is provided to the issue circuitry 16 to enable the availability flags to be updated for any pending operations that use the data value in question as a source operand. It will be appreciated that while steps 315 and 320 are shown sequentially, those steps can be performed in parallel in one implementation.

If at step 310 it is determined that a reduced size representation is possible, then the process proceeds to step 325 where the full data value is again stored to the destination register in the register file. However, in one embodiment, when a register cache 42 is provided, then in this instance the data value is not stored in the register cache, since it is known that a reduced size representation will be provided directly within the relevant entries of the issue circuitry.

In addition to step 325, at step 330 feedback information is provided to the issue circuitry to enable the availability flags to be updated for any pending operations that use the data value in question as a source operand, and in addition the reduced size representation of the data value is provided to overwrite the register identifier for that source operand in the relevant entries of the pending operations queue. Again, whilst steps 325 and 330 are shown sequentially in FIG. 6, it will be appreciated that in one implementation these steps may be performed in parallel. Further, with regards to step 330, and as discussed earlier, the reduced size representation of the data value may be provided a number of clock cycles later than the original feedback information that enables the availability flags to be updated.

Figure 7:
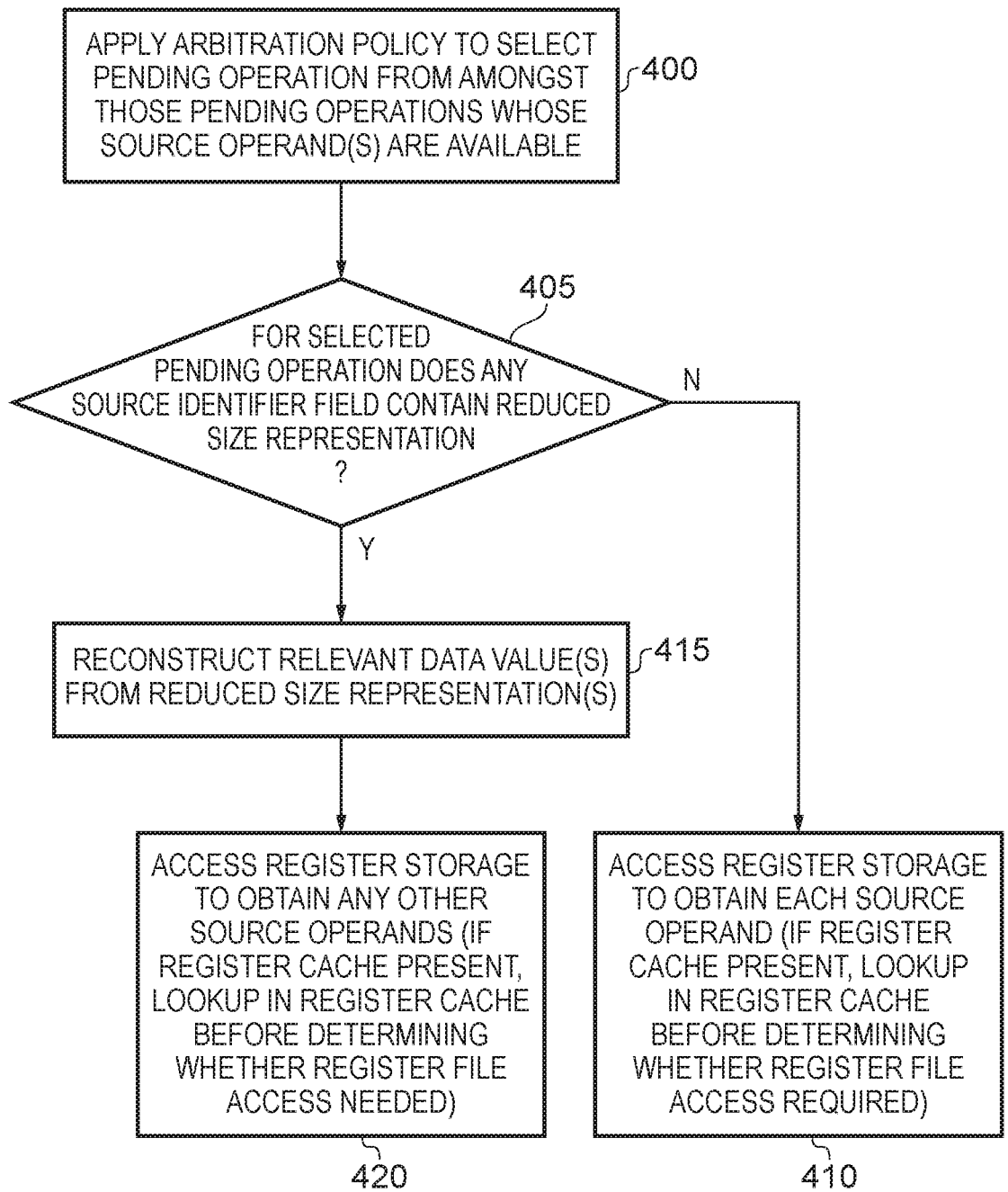
FIG. 7 is a flow diagram illustrating how a pending operation selected from the pending operations queue may be handled in accordance with one example implementation.

FIG. 7 is a flow diagram illustrating how operations may be issued to the execution circuitry from the pending operations queue 100 in one example. At step 400, the operation selection circuitry 110 applies an arbitration policy to select a pending operation from amongst those pending operations whose source operands are available. Whilst for the purposes of FIG. 7, it is assumed that a single pending operation is selected, it will be appreciated that in some implementations multiple operations may be issued in parallel to the execute stage, and accordingly the process shown in FIG. 7 may be applied multiple times in parallel for the selected operations.

At step 405, for the selected pending operation, it is determined whether any source identifier field contains a reduced size representation. If not, then the source operands are obtained in the normal way. In particular, as indicated by step 410, the register storage 14 may be accessed in order to obtain each source operand. If a register cache is present, then this may typically involve a lookup in the register cache in order to decide whether the data value is available in the register cache, so that the register file is only accessed if the data value does not reside within the register cache. Further, as mentioned earlier, there may be other mechanisms to enable the data value to made available to the execute stage. For example, a forwarding path may be provided from the writeback stage directly to the execute stage 18, enabling result values to be propagated directly back into the execute stage without needing to access the register storage 14.

If at step 405 it is determined that a reduced size representation is contained in at least one source identifier field, then at step 415 the relevant data value or data values are reconstructed from the corresponding reduced size representation or reduced size representations. In addition to step 415, then at step 420 the register storage may be accessed to obtain any other source operands. As with step 410, a lookup in the register cache will typically occur first if a register cache is provided as part of the register storage 14. Further, as also discussed earlier with reference to step 410, if a forwarding path is provided for the source operand in question, then it may not be necessary to access the register storage for that source operand at step 420.

From the above described examples, it will be appreciated that the techniques described herein can alleviate the potential bottleneck associated with the register storage when issuing operations to the execute stage of a pipelined processor. In particular, by identifying situations where a reduced size representation of a data value can be stored directly within the issue circuitry's pending operations queue structure, this can reduce the requirement to access the register storage. By such an approach, it is possible to increase the performance of the data processing apparatus and/or to simplify construction of the register file, for example by reducing the number of read ports required.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
execution circuitry configured to perform operations on data values;
a register file comprising a plurality of registers configured to store the data values operated on by the execution circuitry;
issue circuitry comprising a pending operations storage identifying pending operations awaiting performance by the execution circuitry, and selection circuitry configured to select pending operations from the pending operations storage to issue to the execution circuitry;
the pending operations storage comprising an entry for each pending operation, each entry storing attribute information identifying the operation to be performed, the attribute information comprising a source identifier field for each source operand of the pending operation, the source identifier field having a field size large enough to store a register identifier within the source identifier field to identify the register used to store the data value forming the source operand, but the field size being insufficient to store the data value as stored in the register; and
value analysis circuitry responsive to the execution circuitry generating a data value that will be used as a source operand for a pending operation, configured to determine whether a reduced size representation of that generated data value can be accommodated within the associated source identifier field of the entry for that pending operation, and in that event to issue a control signal to the issue circuitry to cause the register identifier for that source operand to be replaced by the reduced size representation of the data value.

2. An apparatus as claimed in claim 1, wherein each entry comprises a source type identifier used to identify whether a source identifier field in that entry stores a register identifier or a reduced size representation of a data value.

3. An apparatus as claimed in claim 1, wherein responsive to the issue circuitry selecting a pending operation from the pending operations storage to issue to the execution circuitry, for each source identifier field of the associated entry that stores a reduced size representation of a data value rather than a register identifier, the data value required by the execution circuitry is reconstructed from the reduced size representation without accessing the register file to obtain the data value.

4. An apparatus as claimed in claim 1, further comprising data value reconstruction circuitry configured to reconstruct a data value from a reduced size representation of that data value stored in a source identifier field.

5. An apparatus as claimed in claim 4, wherein:
the value analysis circuitry is configured to generate the reduced size representation by applying an encoding operation to the data value; and
the data value reconstruction circuitry is configured to apply a corresponding decoding operation to reconstruct the data value.

6. An apparatus as claimed in claim 5, wherein:
the value analysis circuitry is configured to determine that a reduced size representation of the generated data value can be accommodated within a source identifier field when a plurality of determined bits of the generated data value have a defined value;

the encoding operation applied by the value analysis circuitry is configured to generate the reduced size representation by removing the determined bits; and the decoding operation applied by the data value reconstruction circuitry is configured to reintroduce the determined bits with the defined value.

7. An apparatus as claimed in claim 6, wherein the plurality of determined bits are a determined number of most significant bits of the data value, the defined valued for the plurality of determined bits is all zeros, the encoding operation removes the plurality of determined bits, and the decoding operation zero extends the reduced size representation in order to reintroduce the plurality of determined bits.

8. An apparatus as claimed in claim 6, wherein the plurality of determined bits are a determined number of most significant bits of the data value, the defined valued for the plurality of determined bits is all zeros or all ones, the encoding operation removes the plurality of determined bits, and the decoding operation sign extends the reduced size representation in order to reintroduce the plurality of determined bits.

9. An apparatus as claimed in claim 5, wherein a single encoding operation is supported by the value analysis circuitry.

10. An apparatus as claimed in claim 5, wherein a plurality of encoding operations are supported by the value analysis circuitry, and when a reduced size representation of a data value is stored within a source identifier field of an entry, the entry is configured to also maintain an indication of the encoding operation used to produce that reduced size representation, so as to enable the data value reconstruction circuitry to determine the corresponding decoding operation to be applied to reconstruct the data value.

11. An apparatus as claimed in claim 1, wherein each entry further stores control information to identify when the pending operation is available for selection by the issue circuitry, the control information identifying when each data value forming a source operand of the pending operation is available to provide to the execution circuitry, and the selection circuitry being able to select a pending operation for issuance to the execution circuitry once the control information identifies that the data values forming all source operands of that pending operation are available to provide to the execution circuitry.

12. An apparatus as claimed in claim 11, wherein as operations generating data values are performed by the processing circuitry, feedback information is provided to the issue circuitry to enable the control information for the entries in the pending operations storage to be updated.

13. An apparatus as claimed in claim 12, wherein the value analysis circuitry is configured to generate the reduced size representation of the generated data value for provision to the issue circuitry in association with the feedback information relating to that generated data value.

14. An apparatus as claimed in claim 1, further comprising:

a register cache comprising a plurality of cache entries and configured to cache a subset of the data values, each cache entry configured to store a data value and an indication of the register associated with that cached data value; and the register cache being configured to avoid allocating cache entries for a data value having a reduced size representation stored within the pending operations storage.

15. An apparatus as claimed in claim 1, further comprising:

decode circuitry configured to decode instructions in order to produce decode information identifying the operations to be performed by the execution circuitry;

the entries in the pending operations storage being populated based on the decode information produced by the decode circuitry.

16. An apparatus as claimed in claim 15, wherein:

the instructions identify architectural registers and the apparatus further comprises rename circuitry configured to map those architectural register to the registers in the register file, the registers in the register file forming physical registers, and the number of physical registers exceeding the number of architectural registers; and each source identifier field in the entries of the pending operations storage is configured to store a register identifier identifying a physical register unless that register identifier is replaced by a reduced size representation of the associated data value.

17. A method of storing source operands in an apparatus comprising execution circuitry for performing operations on data values, and a register file comprising a plurality of registers for storing the data values operated on by the execution circuitry, the method comprising:

providing a pending operations storage identifying pending operations awaiting performance by the execution circuitry, the pending operations storage comprising an entry for each pending operation, each entry storing attribute information identifying the operation to be performed, the attribute information comprising a source identifier field for each source operand of the pending operation, the source identifier field having a field size large enough to store a register identifier within the source identifier field to identify the register used to store the data value forming the source operand, but the field size being insufficient to store the data value as stored in the register;

determining, responsive to the execution circuitry generating a data value that will be used as a source operand for a pending operation, whether a reduced size representation of that generated data value can be accommodated within the associated source identifier field of the entry for that pending operation; and in the event that the reduced size representation can be accommodated, issuing a control signal to the issue circuitry to cause the register identifier for that source operand to be replaced by the reduced size representation of the data value.

18. An apparatus comprising:

execution means for performing operations on data values;

register file means comprising a plurality of registers for storing the data values operated on by the execution means;

issue means comprising a pending operations storage for identifying pending operations awaiting performance by the execution means, and selection means for selecting pending operations from the pending operations storage to issue to the execution means;

the pending operations storage comprising an entry for each pending operation, each entry storing attribute information identifying the operation to be performed, the attribute information comprising a source identifier field for each source operand of the pending operation, the source identifier field having a field size large enough to store a register identifier within the source identifier field to identify the register used to store the data value forming the source operand, but the field size being insufficient to store the data value as stored in the register; and value analysis means for determining, in response to the execution means generating a data value that will be used as a source operand for a pending operation, whether a reduced size representation of that generated data value can be accommodated within the associated source identifier field of the entry for that pending operation, and in that event to issue a control signal to the issue means to cause the register identifier for that source operand to be replaced by the reduced size representation of the data value.

* * * * *